United States Patent [19]

Hillier

[11] 4,218,162
[45] Aug. 19, 1980

[54] DRILLING BIT

[75] Inventor: Raymond G. Hillier, Coopers Plains, Australia

[73] Assignee: Elizabeth Jean Hillier, Coopers Plains, Australia; a part interest

[21] Appl. No.: 956,822

[22] Filed: Nov. 1, 1978

[51] Int. Cl.³ .......................... B23B 51/00; B23C 5/20
[52] U.S. Cl. ...................................... 408/188; 407/62; 408/713
[58] Field of Search ................. 408/59, 144, 187, 188, 408/223, 713, 211, 226; 407/36, 40, 42, 54, 62, 63

[56] References Cited

U.S. PATENT DOCUMENTS

| | | | |
|---|---|---|---|
| 3,751,177 | 8/1973 | Faber | 408/226 X |
| 3,759,625 | 9/1973 | Iversen | 408/188 |
| 3,963,365 | 6/1976 | Shallenberger, Jr. | 408/713 X |

FOREIGN PATENT DOCUMENTS 751130  1/1967  Canada ...................................... 408/211

*Primary Examiner*—Z. R. Bilinsky
*Attorney, Agent, or Firm*—Schwartz, Jeffery, Schwaab, Mack, Blumenthal & Koch

[57] ABSTRACT

A drilling bit has cutting edges radiating from its axis, each being a segmental part of a circular cutter the axis of which is substantially tangential to a circle centered on the bit axis, the cutters being at different distances from the bit axis. The cutters may be rotated to enable worn cutting edges to be replaced and the extremities of all cutting edges are substantially in a plane normal to the bit axis.

1 Claim, 4 Drawing Figures

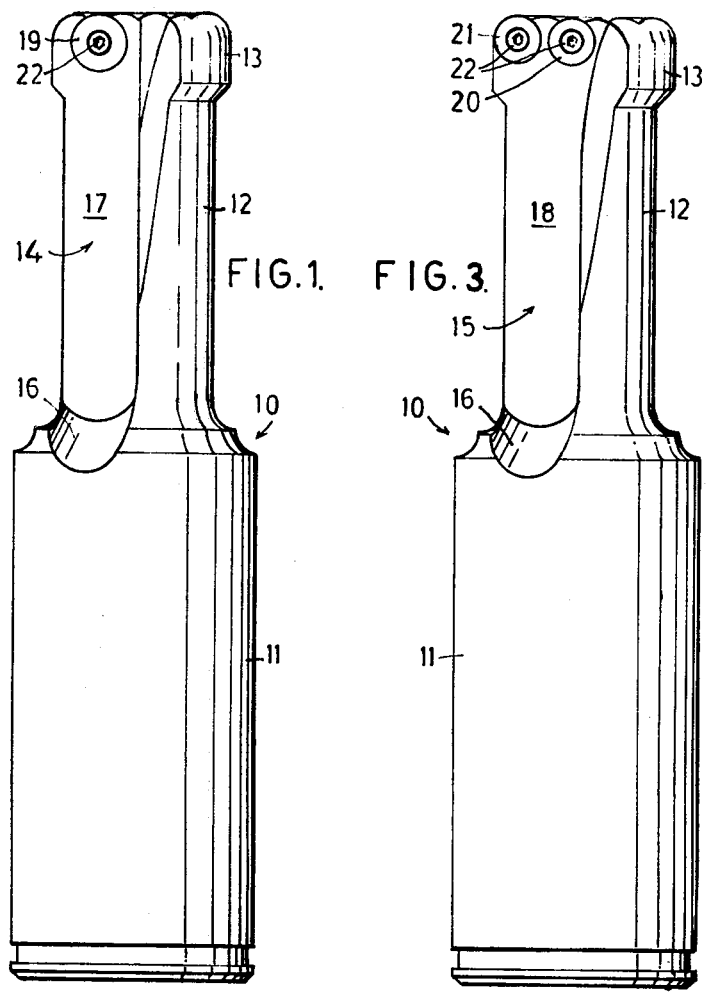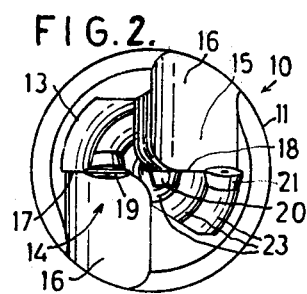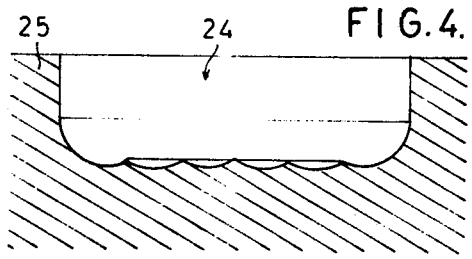

DRILLING BIT

BACKGROUND OF THE INVENTION

This invention relates to an improved drilling bit.

The general object of the invention is to provide a drilling bit, usable particularly for drilling metal but also applicable to other purposes, which is particularly efficient and durable in operation. Another object of the invention is to provide such a bit of which the cutting edge portions are quickly and easily replaceable, so that time consuming sharpening operations are unnecessary. A further object of the invention is to provide such a drilling bit which is capable of drilling substantially flat-bottomed holes.

SUMMARY OF THE INVENTION

With the foregoing and other objects in view, the invention resides broadly in a drilling bit wherein the cutting edges consist of segmental parts of substantially circular cutters each with its axis substantially tangential to a circle centred on the axis of the bit, the axes of the cutters being at different distances from the bit axis, the cutters preferably being arranged to cut a substantially flat-bottomed hole in a work piece, and being rotatable to enable worn cutting edge parts to be quickly replaced by unworn parts of the cutters. Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein:

FIG. 1 is a side elevational view of a drilling bit according to the invention,

FIG. 2 is a plan view of the bit,

FIG. 3 is a side elevational view of the bit from the direction diametrically opposite to that of FIG. 1, and FIG. 4 is a sectional view, to larger scale, of a hole drilled with the bit shown in FIGS. 1, 2 and 3.

DESCRIPTION OF THE PREFERRED EMBODIMENT

The shank 10 of the drilling bit is made with a larger diameter part 11 for engagement by a drilling machine, and a coaxial reduced or clearance diameter part 12, terminating in a coaxial head 13 of increased diameter. The head 13 and the shank part 12 are formed with two opposed longitudinal flutes 14 and 15 leading to runouts at 16.

Each of the flutes is principally defined by two faces substantially perpendicular to each other and in planes radial to the axis of the bit. At the head of the bit, the leading face 17 of the flute 14, and the leading face 18 of the flute 15, are formed with substantially frusto-conical recesses to receive closely a series of rotatable tungsten carbide cutters, a single cutter 19 being set into the flute leading face 17, and two cutters 20 and 21 being set into the flute leading face 18, each of the cutters being axially apertured and rotatably engaged on a pivot screw 22 threadedly engaged in the bit head and tightened to lock the cutter releasably in place. The cutters 19, 20 and 21 are arranged with the transverse diameters of their leading faces, which are at the larger-diameter ends of the cutters, on a line which is diametral with respect to the bit head 13. As indicated in FIG. 2, the leading face of the cutter 20 is in a plane passing through the axis of the bit, but the other cutters 19 and 21 are somewhat raked or inclined to this plane. Each of the cutters 19, 20 and 21 has a segmental part or cutting edge extending from the extremity of the bit head, the cutter 21 being also at one side of the bit head, the cutter 20 extending, in the direction away from cutter 21, somewhat beyond the axis of the bit. The axis of the cutter 19, which is of somewhat larger diameter than the similar cutters 20 and 21, is spaced from the axis of the bit by a distance mid-way between the distances of the axes of the cutters 20 and 21 from the bit axis. The projecting segmental parts or cutting edges of the cutters are backed by concentric arcuate projections 23 from the end of the bit head 13.

In use, when the bit is rotated and brought to a work piece, or the bit is held stationary and a work piece is rotated and brought to it, on a lathe, for example, the three cutters 19, 20 and 21 are brought at the same time onto the work piece and cut into it to form, initially, three concentric shallow grooves which are quickly merged so that, as shown in FIG. 4, the hole 24 formed in the work piece 25 is nearly flat bottomed. To form a hole of a certain diameter to a predetermined depth, then, requires the cutting of less metal than is the case when a conventional bit is used, forming a hole with a coned bottom. As the exposed cutting segment of the innermost cutter 20 extends slightly beyond the axis of the bit, no central nib of metal is left when the hole is drilled.

Tests have shown that bits according to the invention may be used to drill a large number of holes in very hard metal with far less wear than is usual in conventional bits, and the bits according to the invention have been found to be of very high efficiency, and capable of being operated at speeds and pressures not practical with conventional bits.

When the cutters become worn, each may be quickly and easily turned to expose a fresh and unworn cutting segment, and when the cutters finally become unserviceable, they may be very easily and conveniently replaced.

I claim:

1. A drilling bit of the type comprising a plurality of cutters each having cutting edges into a plane substantially radial to the axis of the bit, wherein, said drilling bit includes a reduced diameter shank and an outer head of greater diameter than said shank, said cutters being mounted in said outer head, said shank portion of said bit being formed with two opposed longitudinal flutes adjacent the outer end of which said cutters are mounted, the faces of said flutes being perpendicular to each other and in planes radial to the axis of said bit;

each of said cutters is of substantially frusto-conical shape and rotatable about its axis to expose a fresh cutting segment, means are provided for releasably locking each of the cutters against rotation about its axis, each cutting edge consists of a segmental part of a substantially circular cutter each with its axis substantially tangential to a circle centered on the axis of the bit, the cutters being so arranged that the extremities of their cutting edges are substantially in a diametral plane perpendicular to the axis of the bit, the axes of the cutters being at different distances from the axis of the bit, one of said cutting edges intersecting, near to one side thereof, the axis of the bit, two cutters being mounted in the leading face of one flute, and one cutter being mounted in the leading face of the outer flute, the cutters intersecting the axis of said bit having its face in a plane passing through said axis, and the outer cutters having leading faces which are somewhat inclined to the plane of said cutter intersecting the bit axis, the diameter of one of said cutters is slightly larger than the diameter of the other two cutters, with said one cutter being spaced from the axis of the bit a distance approximately midway between the distances of the axes of the other cutters from the bit axis, and concentric arcuate projections are formed on the end of said drilling bit which back the projecting segmental cutting edges of the cutters.

* * * * *